US011456969B2

(12) United States Patent
Annamary et al.

(10) Patent No.: US 11,456,969 B2
(45) Date of Patent: Sep. 27, 2022

(54) PREDICTIVE HANDOVER OF TRAFFIC IN AN AGGREGATION NETWORK

(71) Applicant: HEWLETT PACKARD ENTERPRISE DEVELOPMENT LP, Houston, TX (US)

(72) Inventors: Suganya John Bosco Sesu Annamary, Bangalore (IN); Chandru Ds, Bangalore (IN); Sivakumar Ramasamy, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 224 days.

(21) Appl. No.: 16/539,012

(22) Filed: Aug. 13, 2019

(65) Prior Publication Data
US 2021/0051115 A1    Feb. 18, 2021

(51) Int. Cl.
*H04L 49/505* (2022.01)
*H04L 45/00* (2022.01)
*H04L 45/24* (2022.01)
*H04L 49/50* (2022.01)

(52) U.S. Cl.
CPC .......... *H04L 49/505* (2013.01); *H04L 45/245* (2013.01); *H04L 45/66* (2013.01); *H04L 49/501* (2013.01)

(58) Field of Classification Search
CPC ..... H04L 49/505; H04L 45/66; H04L 45/245; H04L 49/501
See application file for complete search history.

(56) References Cited

U.S. PATENT DOCUMENTS

| 9,369,408 | B1 | 6/2016 | Raghavan et al. | |
| 9,660,901 | B2 * | 5/2017 | Sivasankar | H04L 45/245 |
| 9,787,591 | B2 | 10/2017 | Bello et al. | |
| 10,476,797 | B2 * | 11/2019 | Natarajan | H04L 45/54 |
| 10,616,049 | B2 * | 4/2020 | Janardhanan | H04L 41/0803 |
| 10,673,703 | B2 * | 6/2020 | Vobbilisetty | H04L 41/0886 |
| 10,673,744 | B2 * | 6/2020 | Ford | H04L 45/245 |
| 11,212,179 | B2 * | 12/2021 | Jailani | H04L 12/413 |

(Continued)

FOREIGN PATENT DOCUMENTS

WO    WO-2016122934    8/2016

OTHER PUBLICATIONS

Stateful Load Balancing for Aggregated Ethernet Interfaces Using 5-tuple Data, (Research Paper), Aug. 31, 2017, 6 Pgs.

(Continued)

*Primary Examiner* — Mounir Moutaouakil
(74) *Attorney, Agent, or Firm* — Nolte Intellectual Property Law Group

(57) ABSTRACT

An MC-LAG system may operate to monitor load conditions existing in two network switches, and to compute a load index value based on detected load conditions. If a computed load index value for a first switch is determined to exceed a predetermined threshold, an overloaded switch may predictively cause traffic to be routed to a second switch prior to rebooting of the first switch. Load index values may be computed based upon factors including excessive inter-switch link ("ISL") flapping, excessive MAC flush or MAC move operations in a switch, excessive processing resource utilization in a switch.

20 Claims, 6 Drawing Sheets

(56) References Cited

U.S. PATENT DOCUMENTS

| | | | |
|---|---|---|---|
| 2003/0058859 A1* | 3/2003 | Wu | H04L 49/351 |
| | | | 370/392 |
| 2012/0163164 A1 | 6/2012 | Terry et al. | |
| 2014/0078882 A1* | 3/2014 | Maltz | H04L 41/145 |
| | | | 370/216 |
| 2014/0079064 A1* | 3/2014 | Angst | H04L 45/7453 |
| | | | 370/392 |
| 2014/0133486 A1* | 5/2014 | Sivasankar | H04L 49/70 |
| | | | 370/392 |
| 2014/0369186 A1* | 12/2014 | Ernstrom | H04L 45/586 |
| | | | 370/228 |
| 2015/0263991 A1* | 9/2015 | Macchiano | H04L 43/0811 |
| | | | 370/400 |
| 2015/0312088 A1* | 10/2015 | Ramakrishnan | H04L 45/28 |
| | | | 370/218 |
| 2016/0149821 A1* | 5/2016 | Bello | H04L 45/22 |
| | | | 370/237 |
| 2017/0048146 A1* | 2/2017 | Sane | H04L 45/38 |
| 2017/0303165 A1 | 10/2017 | Adams et al. | |
| 2017/0310548 A1* | 10/2017 | Jailani | H04L 41/0806 |
| 2019/0104150 A1* | 4/2019 | Gobriel | H04L 63/1416 |
| 2021/0051761 A1* | 2/2021 | Kahn | H04W 76/12 |

OTHER PUBLICATIONS

Wikipedia, "MC-LAG", available online at <https://en.wikipedia.org/w/index.php?title=MC-LAG&oldid=902467576>, Jun. 19, 2019, 4 pages.

\* cited by examiner

PREDICTIVE HANDOVER OF TRAFFIC IN AN AGGREGATION NETWORK

BACKGROUND

The term "multi-chassis link aggregation" ("MC-LAG") refers to a system in which two switches in a communications network are integrated into an active/active virtualized high-availability switch. In an MC-LAG system, an inter-switch connection may be established between two switches for the exchange of control information and data. An MC-LAG system allows two switches to present as one virtualized switch.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
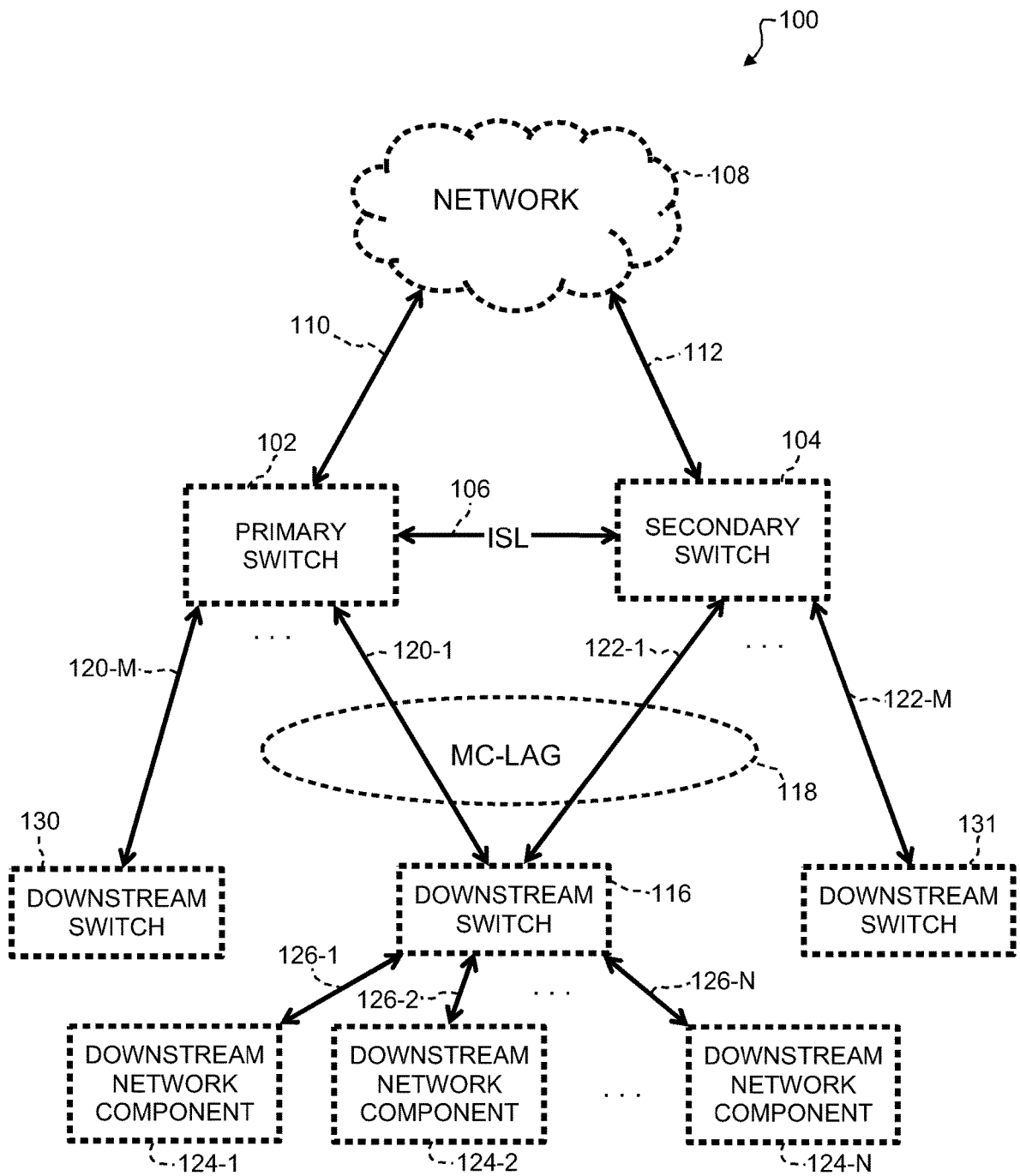
FIG. 1 is a block diagram of an MC-LAG system, according to one or more examples of the disclosure.

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Further, as used herein, the article "a" is intended to have its ordinary meaning in the patent arts, namely "one or more." Herein, the term "about" when applied to a value generally means within the tolerance range of the equipment used to produce the value, or in some examples, means plus or minus 10%, or plus or minus 5%, or plus or minus 1%, unless otherwise expressly specified. Further, herein the term "substantially" as used herein means a majority, or almost all, or all, or an amount with a range of about 51% to about 100%, for example. Moreover, examples herein are intended to be illustrative only and are presented for discussion purposes and not by way of limitation.

A link aggregation group or "LAG" is a method of inverse multiplexing over multiple network interfaces, such as Ethernet interfaces, thereby increasing bandwidth and providing redundancy. LAG systems allow one or more interfaces to be aggregated together in a group, such that a media access control ("MAC") client can treat the LAG as if it were a single interface. As specified by IEEE 802.1AX-2008 standard, this transparency is achieved by the LAG using a single MAC address for all the device's ports in the LAG group. A LAG may be configured as either static or dynamic. Dynamic LAG systems may use a peer-to-peer protocol for control, such as the Link Aggregation Control Protocol ("LACP"), which is also specified in the aforementioned IEED 802.1AX-2008 standard.

An MC-LAG system adds switch-level redundancy to the normal link-level redundancy provided by a LAG. MC-LAG thus allows two or more switches to share a common LAG endpoint. The multiple switches present a single logical LAG to the remote end. Switches in an MC-LAG configuration may communicate to synchronize and negotiate automatic switchovers of traffic carried by the MC-LAG.

In an MC-LAG system, two or more switches may be interconnected by an inter-switch links ("ISL"). An ISL facilitates coordinated operation of the two or more switches, including allowing exchange of data between the switches. In an MC-LAG system including two switches, one switch may operate as a primary device and the other switch may operate as a secondary device. If synchronization of configuration is enabled, the configuration of the primary device will be synchronized with the configuration of the secondary device via an ISL. Once synchronization between primary and secondary switching devices is accomplished, network traffic may flow through the aggregated switches, which appear to other downstream network components to be a single logical or "virtualized" switch. Furthermore, media access control ("MAC") information and address resolution protocol ("ARP") information obtained by each aggregated switch may be synchronized between the switches.

In MC-LAG systems, a downstream network component is logically unaware of the existence of aggregated and separate upstream switches. A downstream network component communicates packets on one of the interfaces to the MC-LAG aggregated switches, as determined by a hashing algorithm cooperatively implemented by the MC-LAG-configured switches as well as downstream network components, such as downstream switches. In some examples, the hashing algorithm is implemented cooperatively as a "daemon" or background process executing on one or more components of the MC-LAG-configured system.

In MC-LAG systems where MAC and ARP information is synchronized between primary and secondary MC-LAG-configured switches, traffic may flow through either switch. When a primary MC-LAG switch's utilization load is high, a monitoring process may cause a reboot of that primary switch. This may cause data that was flowing through the primary switch to be lost for some period of time until data is re-hashed to the secondary switch. For example, some time may be required for the secondary switch to detect that the primary switch is being rebooted.

While MC-LAG systems are capable of handling more traffic in real-time as compared with non-aggregated systems, MC-LAG topologies may be complex, and the real-time performance of MC-LAG systems may be diminished by certain loading factors leading to high load conditions, potentially causing the MC-LAG system to become unresponsive and potentially resulting in a loss of traffic.

To address issues of loading conditions and load balance on switches in an MC-LAG system, the aforementioned hashing algorithm may be implemented to determine the traffic carried by each switch both during normal operation and during periods of high load conditions on one or more of the aggregated switches. Such a hashing algorithm may be implemented by the switches, as coordinated via one or more ISLs connecting the switches. If a load condition is determined to exist in one aggregated switch, the hashing algorithm may cause traffic to the overloaded switch to be re-hashed to another of the aggregated switches. When the capability of an aggregated switch suffers due to system load, the data flowing through that switch may also be affected, potentially resulting in data loss. This data loss may continue until the load on the switch reduces, or until the switch is rebooted. While an aggregated switch is being rebooted, the overall throughput of the MC-LAG system is reduced. Moreover, upon resumption of operation of a rebooted switch, the MAC and ARP information must be restored to the rebooted switch, which can tax ISL capabilities.

According to one or more example implementations of the present disclosure, identifying load conditions by taking into consideration not only memory and CPU usage but also relevant MC-LAG parameters may provide for detection of and response to high load conditions such that minimal or no data loss in an MC-LAG system may be realized.

Referring to FIG. 1, there is shown a block diagram of an MC-LAG system 100, according to one or more examples. In the system 100 of FIG. 1, a primary MC-LAG-configured switch ("primary switch") 102 and a secondary MC-LAG-configured switch ("secondary switch") 104 are connected by an inter-switch link ("ISL") 106. Further, primary switch 102 is connected to a central network 108 by a network connection 110, and secondary switch 104 is connected to central network 108 by a network connection 112.

Primary switch 102 and secondary switch 104 may each provide a plurality of interfaces to downstream devices. In the example of FIG. 1, primary switch may provide a plurality of interfaces 120-1 . . . 120-M, each connecting to separate downstream devices. In the example of FIG. 1, downstream interface 120-1 is coupled to downstream switch 116, and downstream interface 120-M is coupled to downstream switch 130. Similarly, secondary switch 104 provides a plurality of interfaces 122-1 . . . 122-M to downstream devices; in the example of FIG. 1, interface 122-1 is coupled to downstream switch 116, and interface 122-M is coupled to a downstream switch 131. Furthermore, in this example, downstream interfaces 120-1 and 122-1 are aggregated in an MC-LAG configuration to provide MC-LAG connectivity for downstream switch 116. Other interfaces, such as downstream interface 120-M from primary switch 102 may be part of a separate MC-LAG system (not shown) served by primary switch 102; likewise, interface 122-M provided by secondary switch 104 may be part of a separate MC-LAG system.

A plurality of downstream network components 124-1 . . . 124-N may be connected through a downstream device such as downstream switch 116 by means of a corresponding plurality of network connections 126-1 . . . 126-N, in order for each downstream network component 124-1 . . . 124-N to access central network 108. Each downstream network component 124-1 . . . 124-N has its own media access control ("MAC") address, the MAC addresses being unique identifiers assigned to network interface controllers ("NICs") (not separately shown) associated with each downstream network component 124-1 . . . 124-N.

Primary switch 102 or secondary switch 104 may "learn" the MAC addresses of individual downstream network components 124-1 . . . 124-N using the Address Resolution Protocol ("ARP") communications protocol. Since primary switch 102 and secondary switch 104 are MC-LAG-configured, switches 102 and 104 may synchronize the MAC address information each switch 102 and 104 learns about connected downstream network components 124-1 . . . 124-N. This synchronization occurs across ISL 106, and constitutes processing overhead incurred by switches 102 and 104.

Using ARP, switches 102 and 104 may periodically learn of a MAC move, that is, that a MAC address associated with a given connected downstream network component 124 has changed, such as by the downstream network component 124 being moved to a different NIC. Upon one switch 102 or 104 learning of a MAC move, the updated MAC address information is synchronized with the other switch 102 or 104, via ISL 106.

Each switch 102 and 104 may periodically "flush" the MAC address information it has learned to remove stale MAC addresses, i.e., MAC addresses that are no longer valid for a downstream network component 124. Upon performing such a MAC flush, the resulting MAC address information of each switch 102, 104 may be synchronized over ISL 106.

Situations referred to as "ISL flapping" may also occur in an MC-LAG system. ISL flapping refers to situations in which communication across ISL 106 is disrupted, such as when one or the other of switches 102 and 104 is disrupted due, for example, to the rebooting of one of the switches 102 and 104. Both MAC flushing and ISL flapping, may cause overloading issues to arise in the operation of MC-LAG switching systems, since MAC and ARP information is synchronized between switches 102 and 104 across ISL 106.

In the example of FIG. 1, downstream switch 116 is coupled to primary switch 102 and secondary switch 104 via a logical MC-LAG connection 118 consisting of a downstream interface 120 to primary switch 102 and a downstream interface 122 to secondary switch 104. The downstream interfaces 120, 122 are physical connections. Although only single interfaces 120 and 122 are represented in FIG. 1, in other examples multiple interfaces may be provided between downstream switch 116 and primary switches 102 and 104. Moreover, although not shown in FIG. 1, primary switches 102 and 104 may be connected to other downstream network components, and an MC-LAG system may incorporate more than the two aggregated switches 102 and 104 shown in the example of FIG. 1.

Because switches 102 and 104 in the example of FIG. 1 are configured in an MC-LAG system, from the perspective of downstream switch 116, connections 120 and 122 appear as a single connection to a single virtualized switch, and hashing functionality, such as a hashing daemon (not shown), executing on downstream switch 116 is responsible for selecting one physical switch to be used for any given communication stream initiated through downstream switch 116, such as a data stream from one of downstream network components 124-1 . . . 124-N.

The aforementioned hashing algorithm is further functionally implemented in part within MC-LAG configured switches 102 and 104. As part of this functional implementation, a switch 102 or 104 may determine that it must hand off its traffic to the other. Primary switch 102, for example, may deactivate interface 120 to downstream switch 116. Upon detection of deactivation of interface 120, the hashing algorithm as implemented by downstream switch 116 will detect such deactivation and adjust operation to utilize interface 122 rather than interface 120, until such time as reactivation of interface 120 is detected. In this example, at such time as primary switch 102 is able to reactivate interface 120, this reactivation will be detected by downstream switch 116, which may then readjust its operation to utilize interface 120.

Figure 2A:
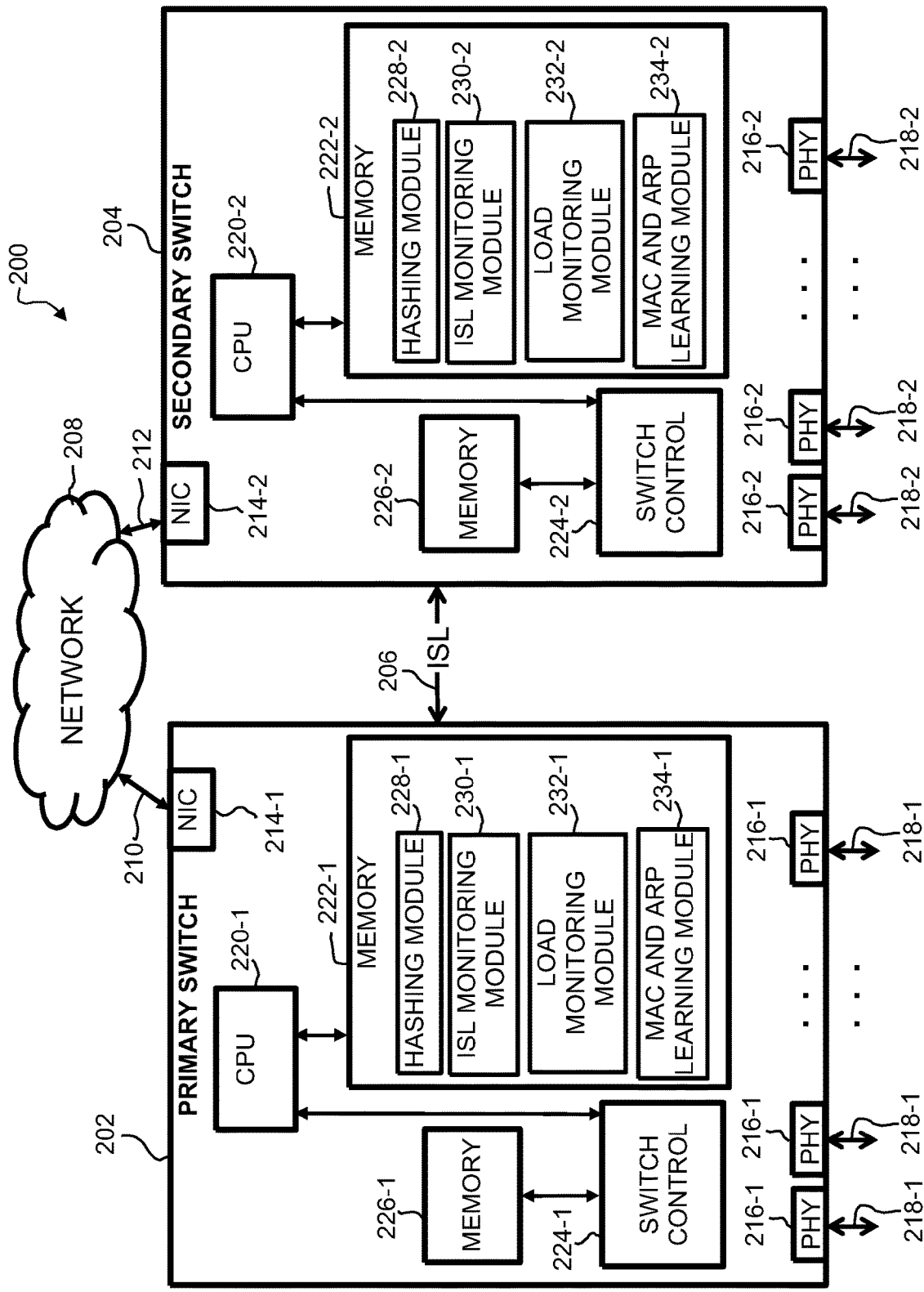
FIGS. 2A and 2B are a block diagram of an MC-LAG system, according to one or more examples of the disclosure.
Figure 2B:
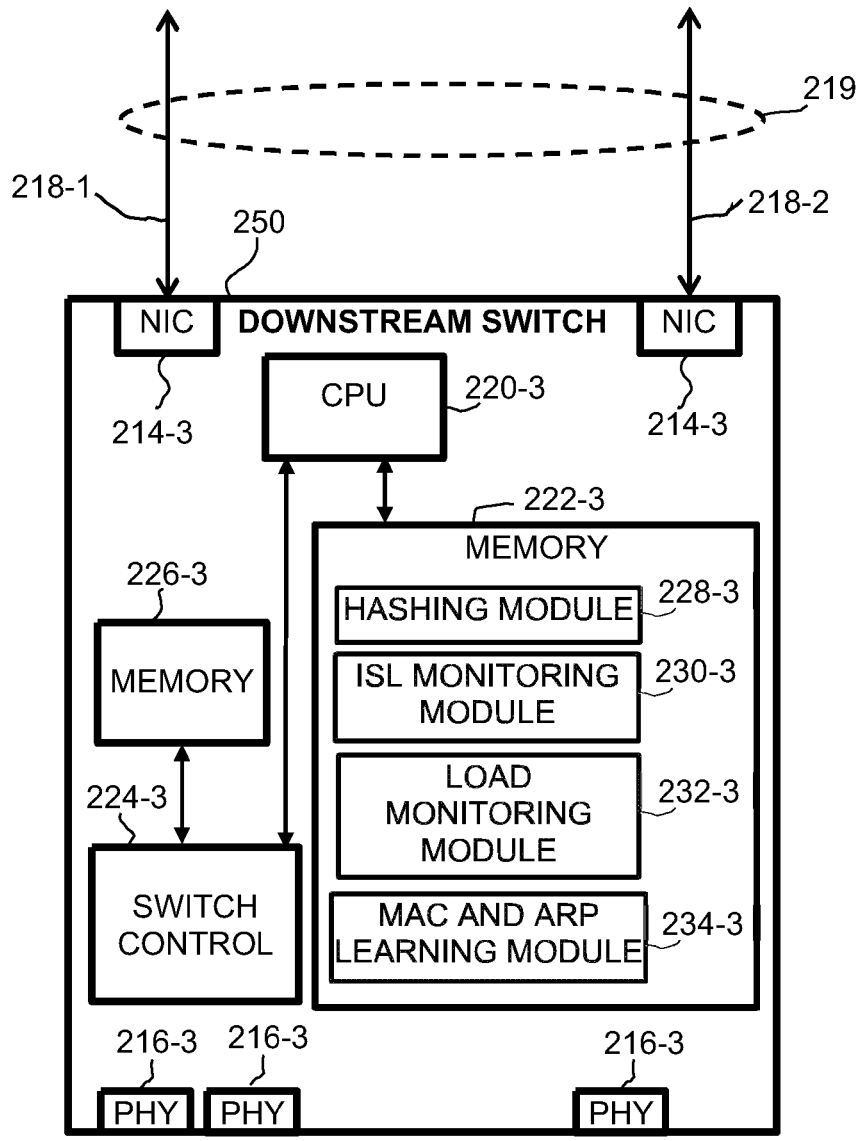

Referring to FIGS. 2A and 2B, there is shown a block diagram of an example MC-LAG system 200 including two MC-LAG-configured switches, namely a primary switch 202 and a secondary switch 204 (FIG. 2A), which are interconnected by an inter-switch link ("ISL") 206, and a downstream switch 250 (FIG. 2B), which is connected in an MC-LAG configuration with respective interfaces 218-1 and 218-2 to primary switch 202 and secondary switch 204. A network interface controller ("NIC") 214-1 in primary switch 202 is coupled to a central network 208 via a network connection 210, and a NIC 214-2 in secondary switch 205 is coupled to central network 208 via a network connection 212.

Primary switch 202 may include at least one physical layer connection ("PHY") circuit 216-1 for connecting primary switch 202 to downstream network components, including in this example downstream switch 250 in FIG. 2B, via at least one downstream connection 218-1; secondary switch 204 may include at least one PHY circuit 216-2 for connecting secondary switch 204 to downstream components (including downstream switch 250 in FIG. 2B) via at least one downstream connection 218-2. In the example of FIGS. 2A and 2B, at least one downstream connection 218-1 is aggregated with at least one downstream connection 218-2 to form an MC-LAG-configured connection to downstream switch 250. Therefore, in the description of the example of FIGS. 2A and 2B herein, switches 202 and 204 are referred to as being aggregated in an MC-LAG configuration.

In the example MC-LAG system 200 of FIGS. 2A and 2B, primary switch 202 includes a central processing unit ("CPU") 220-1 coupled to memory 222-1. In one or more examples, memory 222-1 may comprise more than one type of memory embodied in one or more separate memory units and/or memory devices, including, in some examples, one or more flash memories, programmable read-only memories ("PROMs"), static random access memories ("SRAMs"). Collectively, memory 222-1 serves to store executable code for controlling CPU 220-1 in operating primary switch 202, including executable code corresponding to various functional modules, as described herein. Memory 222-1 may further serve to store parameters and data associated with operation of primary switch 202, including, for example, MAC and ARP information learned by primary switch 202 during operation.

With continued reference to FIGS. 2A and 2B, primary switch 202 includes switch control circuitry 224-1 for performing data transfer and other data switching operations. In one or more examples, switch control circuitry may be implemented as an application-specific integrated circuit ("ASIC"). Switch control circuitry 224-1 may be coupled to memory 226-1. In one or more examples, memory 226-1 may be implemented as one or more separate memory units or separate memory devices, including, in some examples, packet memory for storing data packets as they are routed through primary switch 202, as well as various address and switching rule tables, memory caches, and so on.

In the example MC-LAG system 200 of FIGS. 2A and 2B, secondary switch 204 includes components corresponding in function and implementation to those of primary switch 202, including a CPU 220-2, memory 222-2, and switch control circuitry 224-2 and associated memory 226-2.

As noted, memory 222-1 in primary switch 202 and memory 222-2 in secondary switch 204 store sequences of instructions corresponding to various functional modules. These functional modules may be implemented as sequences of instructions stored in a memory (e.g., memories 222-1, 222-2) executed by respective CPUs 220-1 and 220-2 in one or more examples. Memories 222-1 and 222-2 may store, for example, one or more code sequences corresponding to hashing modules (228-1 in primary switch 202, 228-2 in secondary switch 204) which cooperate to balance the switching load borne by each aggregated switches 202 and 204 by determining which MC-LAG-configured switch 202 or 204 will handle incoming traffic (i.e., network packets) originating from or to be routed to a downstream network device on aggregated network interfaces 218-1 and 218-2.

In addition, each switch 202, 204 includes an ISL monitoring module (module 230-1 in primary switch 202, ISL monitoring module 230-2 in secondary switch 204) for monitoring the status of ISL 206 connecting aggregated switches 202 and 204. For example, ISL monitoring modules 230-1, 230-2 may monitor when inter-switch communication over ISL 206 is disrupted, such as may occur if either aggregated switch 202 or 204 is re-booted. ISL monitoring modules 230-1 and 230-2 may further operate to generate a quantitative value reflecting a frequency of disruptions of ISL 206. ISL monitoring modules 230-1 and 230-2 may operate to generate one or more quantitative values reflecting instances of ISL "flapping," i.e., instances involving an excessive number of disruptions of ISL 206 occurring, such as over during a predetermined time period.

A load monitoring module (module 232-1 in primary switch 202, module 232-2 in secondary switch 204) may operate to monitor the overall load experienced by each respective switch 202, 204. The load on a switch 202, 204 may be evaluated, and may further be quantified as a Load Index Value, based upon a number of factors, such as processor utilization levels experienced by respective CPUs 220-1, 220-2, the number of network packets processed by each switch 202, 204 as established due to the hashing algorithm established by hashing modules 228-1, 228-2, the usage of one or more memory devices comprising respective memories 222-1, 222-2, and so on. In some examples, load monitoring modules such as 232-1 and 232-2 may compute a Load Index Value for respective MC-LAG-configured switches 202, 204 on a repeating basis, in order to track the loading conditions of the respective switches as such loading conditions vary during operation of the MC-LAG system 200.

A MAC and ARP learning module (module 234-1 in primary switch 202, module 234-2 in secondary switch 204) may operate to control respective switches 202, 204 in the learning of MAC addresses using an ARP response-request protocol. Further, MAC and ARM learning modules 234-1, 234-2 may operate to evaluate and quantify the processing overhead experienced by respective switches 202, 204 during operation. For example, MAC and Arm learning modules 234-1 and 234-2 may function to detect and quantify the number of MAC flush and MAC move operations undertaken by switches 202, 204, such as over a given time period.

With reference specifically to FIG. 2B, downstream switch 250 is coupled in an MC-LAG configuration with primary switch 202 and secondary switch 204 (shown in FIG. 2A) via respective interfaces 218-1 and 218-2, which are aggregated in an MC-LAG configuration as reflected by reference numeral 219. In the present example, downstream switch 250 includes a CPU 220-3 and associated memory 222-3, as well as switch control circuitry 224-3 and associated memory 226-3. A hashing module 228-3 in memory 222-3, as executed by CPU 220-3, cooperates with hashing modules 228-1 and 228-2 in primary and secondary switches 202, 204 to control the routing of data through MC-LAG-configured system 200

In an MC-LAG system such as system 200 in the example of FIGS. 2A and 2B, since MAC and ARP processing is synchronized between switches 202, 204, hashing modules 228-1, 228-2 may direct network traffic to flow through either switch 202 or 204. Similarly, hashing module 228-3 in downstream switch 250 cooperates with hashing modules 228-1 and 228-2 to implement a predictive handover of data traffic in accordance with this example.

In operation of MC-LAG system 200 of FIGS. 2A and 2B, once synchronization between primary switch 202 and secondary switch 204 is performed across ISL 206, including, for example, synchronization of learned MAC and ARP information, operation of the MC-LAG system 200 involves data traffic which flows between the aggregated interfaces 218-1 and 218-2. As long as both primary switch 202 and secondary switch 204 are operating normally, synchronization, including MAC and ARP synchronization, will continue across ISL 206.

MC-LAG system 200 is therefore capable of handling more traffic in real-time. However, there are multiple factors which can cause an MC-LAG-configured system such as MC-LAG system 200 to enter a high-usage state, potentially leading to the MC-LAG system 200 becoming unresponsive or to a loss of data traffic. For example, if primary switch 202 becomes overloaded, it may be necessary to re-boot primary switch 202, causing data flowing through primary switch 202 to be interrupted and possibly lost until traffic is re-hashed through secondary switch 204.

In accordance with the present example, therefore, switches are provided with respective load monitoring modules 232-1 and 232-2 for actively monitoring load conditions of switches 202 and 204. In the event that high load conditions are detected by either load monitoring module 232-1 or 232-2, the affected switch 202, 204 may predictively notify the other, via ISL 206, of the overload conditions, and then proceed to shut down interfaces (i.e., interfaces 218-1 or 218-2) to downstream components (such as downstream switch 250). Upon detection that downstream interfaces from either primary or secondary switch 202, 204, downstream switch 250 may effectuate a handover of traffic to the active interfaces, thus avoiding unanticipated unavailability of an upstream connection to the MC-LAG-configured switches 202, 204 that are upstream.

In one example, predictive re-hashing of traffic from downstream switch 250 through MC-LAG-configured switches 202, 204 may be based upon computing, in primary switch 202 and secondary switch 204, a load index value based on the above-described monitoring and evaluation of one or more load parameters associated with operation of respective switches 202, 204. In one example, hashing modules 228-1 and 228-2 may determine that a reboot of a switch 202 or 204 is desired whenever a particular load index value exceeds a predetermined threshold.

A load index value reflecting the loading of a switch 202 or 204 may be computed as a function of one or more load parameters monitored and evaluated by modules in the respective switch, including, for example ISL monitoring modules 230-1, 230-2, load monitoring modules 232-1, 232-2, and MAC and ARP learning modules 234-1, 234-2. A predetermined load threshold value may be defined for determining whether a switch 202 or 204 is experiencing excessive loading, such that the switch 202 or 204 should be rebooted.

For example, MAC and ARP learning module 234-1 in primary switch 202 may determine that a number of MAC flush operations has occurred which exceeds a predetermined threshold. ISL monitoring modules 230-1, 230-2 may determine that the ISL link has flapped an excessive number of times, MAC and ARP learning modules 234-2, 234-2 may determine that the downstream interfaces 218-1 and 218-2 have flapped or otherwise been disrupted an excessive number of times, and so on. Metrics may be defined as part of a load index computation for each switch 202, 204, to anticipate a loading condition and to take remedial action.

Figure 3:
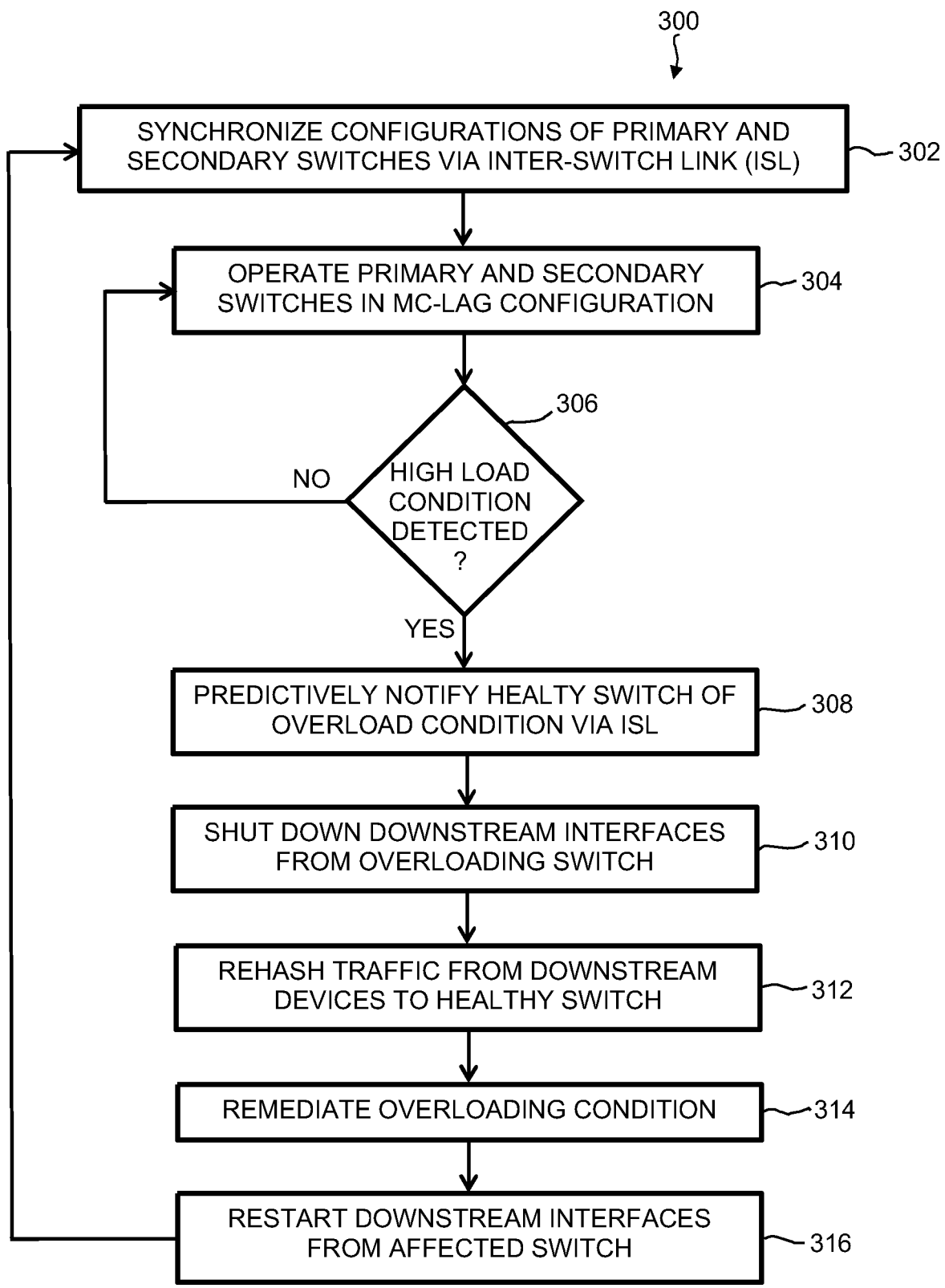
FIG. 3 is a flowchart illustrating operation of an MC-LAG system, according to one or more examples of the disclosure.

Turning to FIG. 3, there is shown a flow diagram illustrating a method 300 for operation of an MC-LAG-configured system such as MC-LAG system 200 from FIGS. 2A and 2B. In method 300 of FIG. 3, block 302 represents synchronization of configurations between primary switch 202 and secondary switch 204 via ISL 206, including synchronization of MAC and ARP information learned by MAC and ARP learning modules 234-1 and 234-2, respectively.

In block 304, primary and secondary switches 202, 204 operate in an MC-LAG configuration, in which one or more of downstream interfaces 218-1 and 218-2 are aggregated to provide data transfer to downstream switch 250. Decision block 306 in FIG. 3 reflects an assessment of whether either load monitoring module 232-1 in primary switch 202 or load monitoring module 232-2 in secondary switch 204 detects a high load condition. If no overload condition is detected in block 306, operation returns to block 304 for continued operation of MC-LAG system 200.

On the other hand, if in block 306 either primary switch 202 or secondary switch 204 is determined to be experiencing a high load condition, based upon computation of a load index value for the respective switch, then in block 308 of FIG. 3, the highly-loaded switch may predictively notify the other switch of the high load condition via ISL 206. Then, as reflected by block 310, the highly-loaded switch may shut down its downstream interfaces (interfaces 218-1 in the case of primary switch 202, interfaces 218-2 in the case of secondary switch 204).

A downstream device, such as downstream switch 250 (FIG. 2B), will detect the interruption of the affected interface(s) to the highly-loaded switch, and respond by its hashing module 228-3 adjusting its hashing algorithm to redirect traffic to the interfaces with the unaffected (i.e., not highly-loaded) MC-LAG-configured switch 202 or 204. This is reflected by block 312 in FIG. 3. Since the upstream switch not undergoing a high load condition has been predictively notified of the interface shutdown, traffic may be re-hashed to that switch with little or no interruption to overall operation of MC-LAG system 200.

In block 314, remedial actions, such as re-booting, may be taken for the highly-loaded switch while traffic continues to be supported through the active switch. Once the overloading conditions have been remediated, the affected switch may resume operation, as reflected by block 316 in FIG. 3. Thereafter, operation resumes with block 302, wherein the configurations of both MC-LAG-configured switches 202, 204 may be re-synchronized. Thus, for example, MAC and ARP information learned by the unaffected switch during the period in which the remedial action of block 314 was taking place, may be synchronized between both MC-LAG-configured switches 202, 204.

Figure 4:
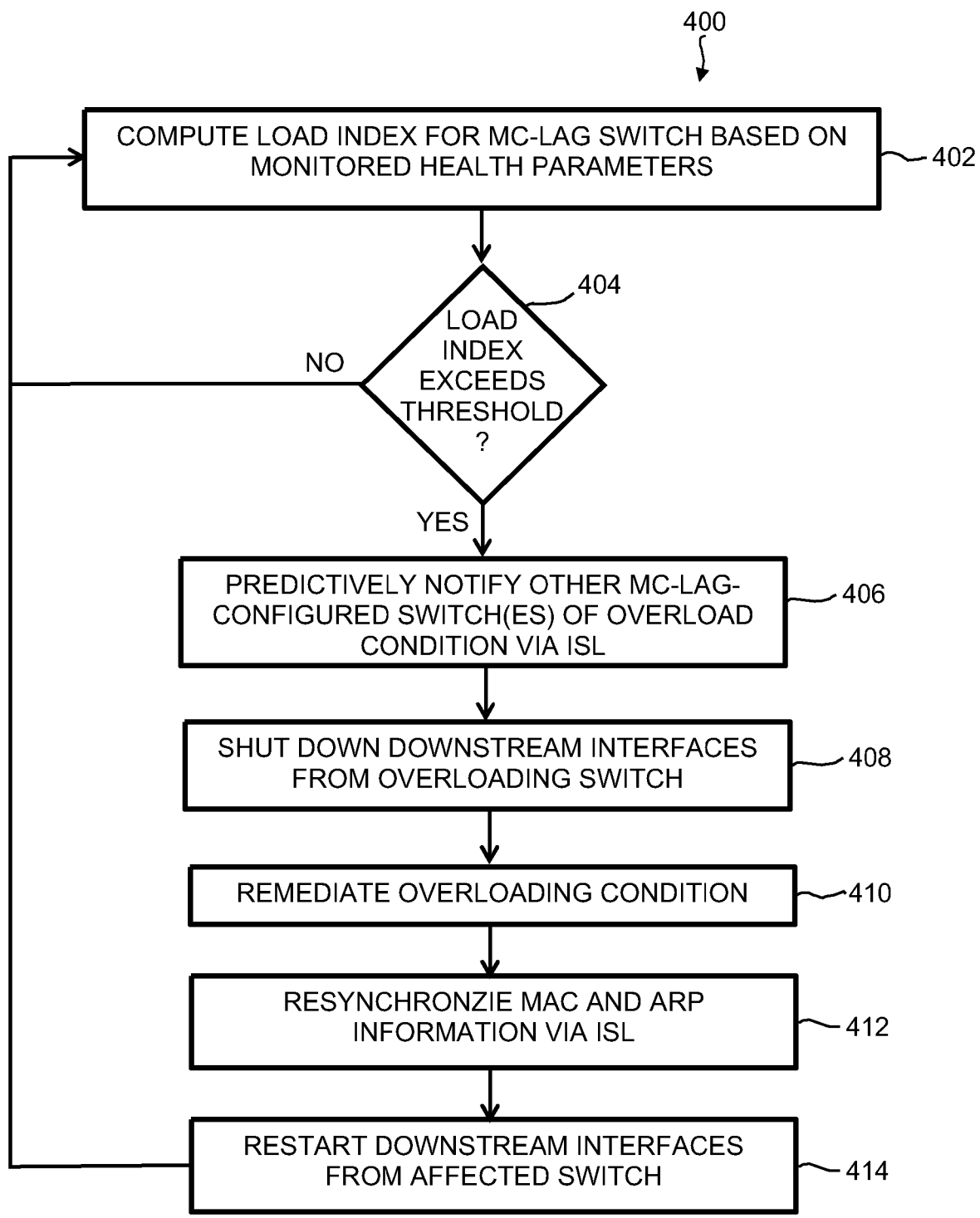
FIG. 4. Is a flowchart illustrating operation of an MC-LAG-configured switch in an MC-LAG system, according to one example of the disclosure.

Turning to FIG. 4, there is shown a block diagram of an example method 400 for determining that a high-load condition is present on an MC-LAG-configured switch, such as switch primary 202 or secondary switch 204 from the example of FIGS. 2A and 2B. In each MC-LAG-configured switch, such as switches 202 and 204 from FIGS. 2A and 2B, respective load monitoring modules 232-1 and 232-2 operate to compute a Load Index Value for the respective switch based on a plurality of health parameters, such as CPU usage, ISL link flapping (disruption) statistics, such as provided by ISL monitoring modules 228-1, 228-2, downstream interface flapping (disruption) statistics, MAC and ARP learning statistics, including numbers of MACs and ARPs learned by switches 202 and 204 and the number of MAC moves detected, such MAC and ARP statistics being provided by MAC and ARP learning modules 234-1, 234-2 in respective switches 202 and 204. The computation of a Load Index Value is represented by block 402 in FIG. 4.

In one example, one switch (primary switch 202 or secondary switch 204 in this example) may predictively hand over traffic to the other in the event that a switch computes a Load Index Value which exceeds some predetermined threshold value. Thus, as represented by decision block 404 in FIG. 4, upon computation of a Load Index Value in block 402, a determination is made whether the computed Load Index Value exceeds the predetermined threshold. If not, operation with continue with a subsequent re-calculation of a Load Index Value by load monitoring module (232-1/232-2).

If in block 404 a Load Index Value for a switch (202/204) is determined to exceed the predetermined threshold, operation proceeds to block 406, wherein the load experiencing the heavy load may predictively notify the other switch of the overload condition, via ISL 206 in the example of FIGS. 2A and 2B. Next, in block 408, the loaded switch shuts down its downstream interfaces, and in block 410, performs actions necessary to remediate the loading condition. Such remedial measures may include, for example, re-booting. However, during the remediation process, a downstream device, such as downstream switch 250, will detect the shutdown of any interface to the loaded switch, and its hashing module 228-3 will adjust its hashing algorithm to redirect traffic through an interface to the non-loaded switch, thereby avoiding interruption or loss of data during the remediation step 410.

Upon resolution of the loading condition in block 410, in block 412, the affected switch will restart and re-synchronize its MAC and ARP information with the other switch, via ISL 206, in order to capture MAC and ARP information which may have been learned by the active switch during the remediation in block 410. Thereafter, as represented by block 414, the affected switch may reactivate its downstream interfaces. Such reactivation will be detected by downstream devices, such as downstream switch 250, causing the hashing module 228-3 to resume its previous MC-LAG operation, thereby ensuring maximum usage of all available interfaces. From block 414, operation returns to block 402 for re-computation of a Load Index Value for the switch.

In one example, a Load Index Value (computed in block 402 in FIG. 4) may be defined and computed according to various metrics. As noted above, a load balancing algorithm for an MC-LAG system composed of a primary switch and a secondary switch, may take into account such factors as the number of downstream interfaces, the number of MACs and ARPs learned in the switch, the number of ISL flaps and downstream interface flaps, CPU utilization within the switch, concurrent services running on the switch, indications that a system is under threat, such as from a denial-of-service ("DOS") attack, and so on.

Figure 5:
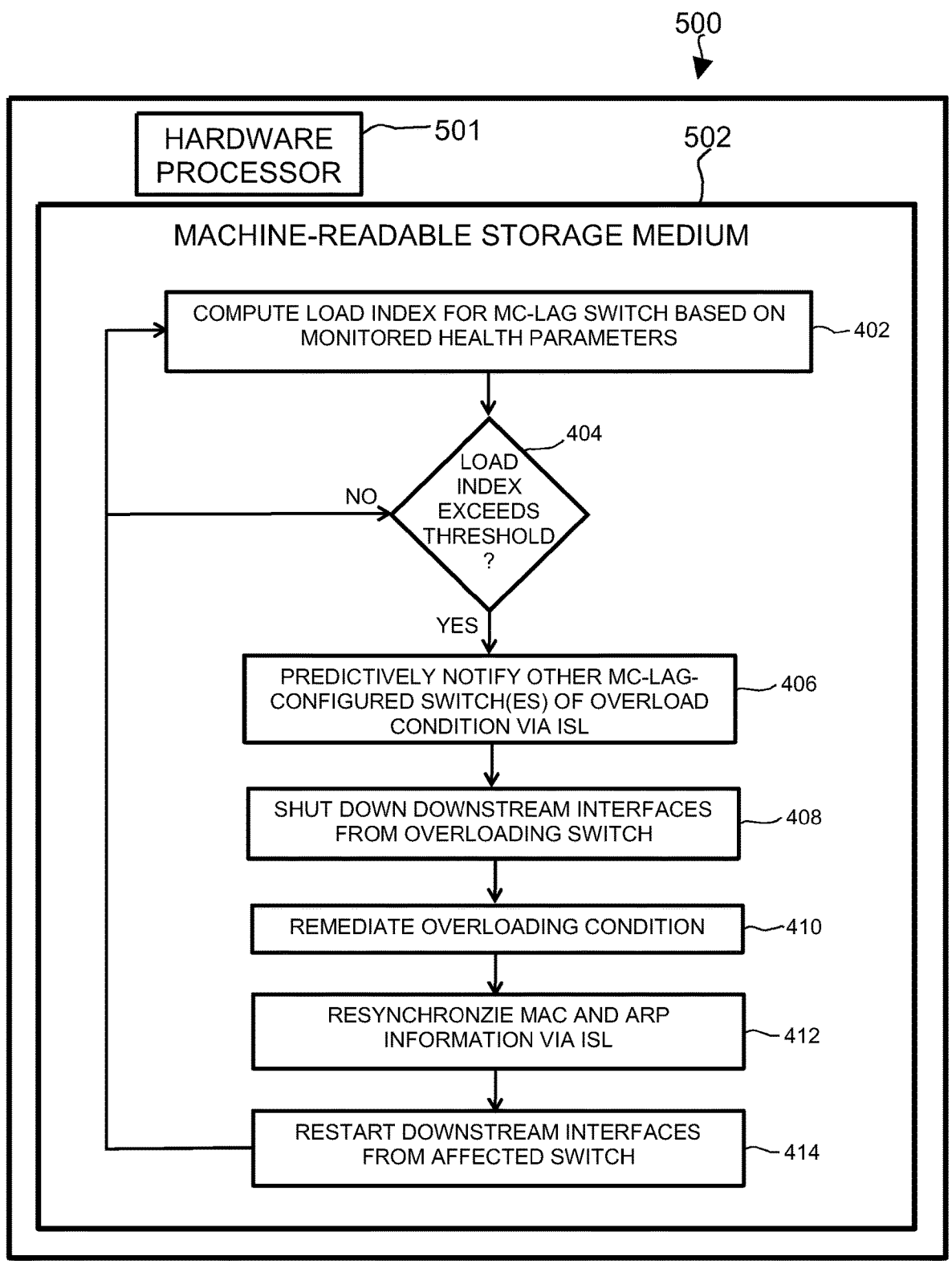
FIG. 5 is a block diagram representing a computing resource 500 implementing the method of FIG. 4 for operating an MC-LAG-configured switch according to one or more disclosed examples

FIG. 5 is a block diagram representing a computing resource 500 implementing a method of operating an MC-LAG-configured switch according to one or more disclosed examples. Computing resource 500 includes at least one hardware processor 501 and a machine-readable storage medium 502. As illustrated, machine readable storage medium 502 may store instructions, that when executed by hardware processor 501 (either directly or via emulation/virtualization), cause hardware processor 501 to perform one or more disclosed methods of reliability prediction and classification. In this example, the instructions stored reflect a method 400 as described with reference to FIG. 4, as performed by a CPU in an MC-LAG-configured switch, such as CPU 220-1 in primary switch 202 or CPU 220-2 in secondary switch 204 from the Example of FIGS. 2A and 2B.

Examples in the present disclosure may also be directed to a non-transitory computer-readable medium storing computer-executable instructions and executable by one or more processors of the computer via which the computer-readable medium is accessed. A computer-readable media may be any available media that may be accessed by a computer. By way of example, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc ("CD"), laser disc, optical disc, digital versatile disc ("DVD"), floppy disk and Blu-ray® disc where disks usually reproduce data magnetically, while discs reproduce data optically with lasers.

Note also that the software implemented aspects of the subject matter claimed below are usually encoded on some form of program storage medium or implemented over some type of transmission medium. The program storage medium is a non-transitory medium and may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The claimed subject matter is not limited by these aspects of any given implementation.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A method of operating a multi-chassis link aggregation group (MC-LAG) system, comprising:
forming the MC-LAG system by aggregating a first interface to a downstream device from a first switch with a second interface to the downstream device from a second switch, wherein an inter-switch link of the MC-LAG system couples the first switch and the second switch;
synchronizing, with the second switch, network address information learned by the first switch via the inter-switch link during operation of the MC-LAG system;
computing a load index value for the first switch as a function of at least one load parameter, wherein the at least one load parameter is variable during operation of the first switch and indicates load of the MC-LAG system at the first switch; and
in response to the load index value exceeding a predetermined threshold value:
sending, via the inter-switch link, a notification message to the second switch indicating re-routing of traffic from the downstream device to the MC-LAG system through the second switch;
disabling the first interface for triggering the re-routing of traffic to the MC-LAG system;
remediating a load condition impacting the load index value at the first switch, wherein the remediated load condition reduces the load index value below the predetermined threshold value; and
re-enabling the first interface for resuming traffic from the downstream device to the MC-LAG system through the first and second switches.

2. The method in accordance with claim 1, wherein the at least one load parameter comprises at least one of: a number of network addresses learned by the first switch; a frequency of interruption of the inter-switch link; a number of detected changes in the network addresses learned by the first switch; a number of interfaces provided by the first switch; a number of disruptions of the interfaces provided by the first switch; and a number of interruptions of downstream connections to the first switch.

3. The method in accordance with claim 1, further comprising:
re-synchronizing, with the second switch, the network address information learned by the first switch and the second switch via the inter-switch link in response to re-enabling of the first interface.

4. The method in accordance with claim 1, wherein the computing of the load index value for the first switch occurs periodically during the operation of the MC-LAG system.

5. The method in accordance with claim 1, further comprising:
implementing a hashing algorithm to direct traffic through the first switch and the second switch.

6. The method in accordance with claim 1, wherein the learned network address information includes Media Access Control (MAC) and Address Resolution Protocol (ARP) information.

7. The method in accordance with claim 1, wherein the remediating the load condition comprises rebooting the first switch.

8. A first switch participating in a multi-chassis link aggregation group (MC-LAG) system, comprising:
a first interface coupled to a downstream device;
a memory coupled to the processor and storing instructions, which when executed by the processor cause the processor to perform a method, the method comprising:
forming the MC-LAG system by aggregating the first interface with a second interface on the second switch coupled to the downstream device, wherein an inter-switch link of the MC-LAG system couples the first switch and the second switch;
synchronizing, with the second switch, network address information learned by the first switch via the inter-switch link during operation of the MC-LAG system;
computing a load index value for the first switch as a function of at least one load parameter, wherein the at least one load parameter is variable during operation of the first switch and indicates load of the MC-LAG system at the first switch; and
in response to the load index value exceeding a predetermined threshold value:
sending, via the inter-switch link, a notification message to the second switch indicating re-routing of traffic from the downstream device to the MC-LAG system through the second switch;
disabling the first interface for triggering the re-routing of traffic to the MC-LAG system;
remediating a load condition impacting the load index value at the first switch, wherein the remediated load condition reduces the load index value below the predetermined threshold value; and
re-enabling the first interface for resuming traffic from the downstream device to the MC-LAG system through the first and second switches.

9. The first switch of claim 8, wherein the method further comprises:
implementing a hashing algorithm for redirecting traffic through the first switch and the second switch.

10. The first switch of claim 8, wherein the learned network address information includes Media Access Control (MAC) and Address Resolution Protocol (ARP) information.

11. The first switch of claim 8, wherein the at least one load parameter comprises at least one of: a number of interfaces provided by the first switch; a frequency of interruptions of the inter-switch link; a number of disruptions of the interfaces provided by the first switch; a frequency of interruption of the inter-switch link; a number of network addresses learned by the first switch; and a number of changes in the network addresses learned by the first switch.

12. The first switch of claim 8, wherein the remediating the load condition comprises rebooting the first switch.

13. The first switch of claim 8, wherein the method further comprises:
re-synchronizing, with the second switch, the network address information learned by the second switch in response to re-enabling of the first interface.

14. The first switch of claim 8, wherein the computing of the load index value for the first switch occurs periodically during the operation of the MC-LAG system.

15. A non-transitory computer-readable medium tangibly embodying instructions executable by a hardware processor to:
form a multi-chassis link aggregation group (MC-LAG) system by aggregating a first interface to a downstream device from a first switch with a second interface to the downstream device from a second switch, wherein an inter-switch link of the MC-LAG system couples the first switch and the second switch;

synchronize, with the second switch, layer 2 network address information learned by the first switch via the inter-switch link during operation of the MC-LAG system;

compute a load index value for the first switch as a function of at least one load parameter, wherein the at least one load parameter is variable during operation of the first switch and indicates load of the MC-LAG system at the first switch;

in response to the load index value exceeding a predetermined threshold:

send, via the inter-switch link, a notification message to the second switch indicating re-routing of traffic from the downstream device to the MC-LAG system through the second switch;

disable the first interface for triggering the re-routing of traffic to the MC-LAG system;

remediate a load condition impacting the load index value at the first switch, wherein the remediated load condition reduces the load index value below the predetermined threshold value; and re-enable the first interface for resuming traffic from the downstream device to the MC-LAG system through the first and second switches.

16. The non-transitory computer-readable medium of claim 15, wherein the at least one load comprises of at least one of: a number of network addresses learned by the first switch; a frequency of interruption of the inter-switch link; a number of detected changes in the network addresses learned by the first switch; a number of interfaces provided by the first switch; a number of disruptions of the interfaces provided by the first switch; and a number of interruptions of downstream connections to the first switch.

17. The non-transitory computer-readable medium of claim 15, wherein the remediation of the load condition comprises rebooting the first switch.

18. The non-transitory computer-readable medium of claim 15, wherein the instructions executable by the hardware processor to further:

re-synchronize, with the second switch, the network address information learned by the second switch via the inter-switch link in response to re-enabling of the first interface.

19. The non-transitory computer-readable medium of claim 18, wherein the learned network address information comprises Medial Access Control (MAC) and Address Resolution Protocol (ARP) information.

20. The non-transitory computer-readable medium of claim 15, wherein the computing of the load index value for the first switch occurs periodically during the operation of the MC-LAG system.

* * * * *